(12) United States Patent
Warashina et al.

(10) Patent No.: US 7,275,325 B2
(45) Date of Patent: Oct. 2, 2007

(54) BUSH CUTTING MACHINE

(75) Inventors: Makoto Warashina, Wako (JP); Hideshi Sasaki, Wako (JP); Hiroaki Uchitani, Wako (JP)

(73) Assignee: Honda Motor Co., Ltd. (JP)

( * ) Notice: Subject to any disclaimer, the term of this patent is extended or adjusted under 35 U.S.C. 154(b) by 0 days.

(21) Appl. No.: 11/139,752

(22) Filed: May 27, 2005

(65) Prior Publication Data

US 2005/0274021 A1 Dec. 15, 2005

(30) Foreign Application Priority Data

Jun. 14, 2004 (JP) .............................. 2004-175588

(51) Int. Cl.
B26B 21/14 (2006.01)
F01N 7/10 (2006.01)

(52) U.S. Cl. .............................. 30/276; 30/76; 30/122; 30/347; 56/11.3; 56/12.7; 440/49

(58) Field of Classification Search ............... 30/76, 30/347, 276, 122, 286, 289, 293, 198, 166; 60/323, 320, 39.52; 440/49, 53, 75, 78, 83, 440/113, 900, 6; 403/62, 83, 84, 105; 56/12.7, 56/12.1, 11.3, 320.1, 17.5, DIG. 9; 188/335, 188/340; 401/1; 477/199, 200; 172/14, 172/111, 120, 247, 253

See application file for complete search history.

(56) References Cited

U.S. PATENT DOCUMENTS

| | | | | |
|---|---|---|---|---|
| 1,824,738 A * | 9/1931 | Johnson et al. | ................ | 440/87 |
| 1,824,739 A * | 9/1931 | Johnson et al. | ........... | 416/93 R |
| 4,179,805 A * | 12/1979 | Yamada | ........................ | 30/122 |
| 4,286,675 A * | 9/1981 | Tuggle | ........................ | 173/213 |
| 4,604,067 A * | 8/1986 | Roberts | ........................ | 440/49 |
| 4,752,256 A * | 6/1988 | Dorion | ........................ | 440/49 |
| 4,976,637 A * | 12/1990 | Newell et al. | ................ | 440/49 |
| 5,348,102 A * | 9/1994 | Roberson | ..................... | 172/15 |
| 6,591,507 B2 * | 7/2003 | Kobayashi et al. | ........... | 30/276 |
| 6,616,489 B1 * | 9/2003 | Dompierre et al. | ........... | 440/49 |
| 2004/0083701 A1 * | 5/2004 | Brower | ........................ | 56/320.1 |

FOREIGN PATENT DOCUMENTS

JP 01024336 10/1983

* cited by examiner

Primary Examiner—Kenneth E. Peterson
Assistant Examiner—Ghassem Alie
(74) Attorney, Agent, or Firm—Adams & Wilks (57) ABSTRACT

A bush cutting machine with a tubular operating pole connected to an outlet of an exhaust muffler and doubling as an exhaust passage is provided. Exhaust gases discharged from an engine flow from the exhaust muffler through the operating pole and are then discharged into the air. The substantial capacity of the exhaust muffler is increased by the operating pole, and the exhaust noise of the engine is reduced.

13 Claims, 12 Drawing Sheets

BUSH CUTTING MACHINE

FIELD OF THE INVENTION

The present invention relates to bush cutting machines and, more particularly, to an art in reducing the exhaust noise of an engine in a bush cutting machine.

BACKGROUND OF THE INVENTION

Weeds on ridges in fields, for instance, are likely to be pest nests, and thus need to be cut several times a year. This work is hard, and thus various machines have been proposed for practical use. Of those machines, bush cutting machines are widely used because of their smallness and ease of handling.

A bush cutting machine has a drive shaft inserted through a tubular operating pole and rotated by an engine provided at one end of the operating pole to rotate a cutting blade provided at the other end of the operating pole. An operator hangs the bush cutting machine on his shoulder, grips a bar-shaped handle provided at a middle portion of the operating pole and swings the operating pole right and left and backward and forward, thereby cutting weeds by the cutting blade. Such bush cutting machines are known in various types (e.g., see Japanese Utility Model Laid-Open Publication No. HEI-1-24336).

The above-described conventional bush cutting machine will be described with reference to FIGS. 15 and 16.

Figure 15:
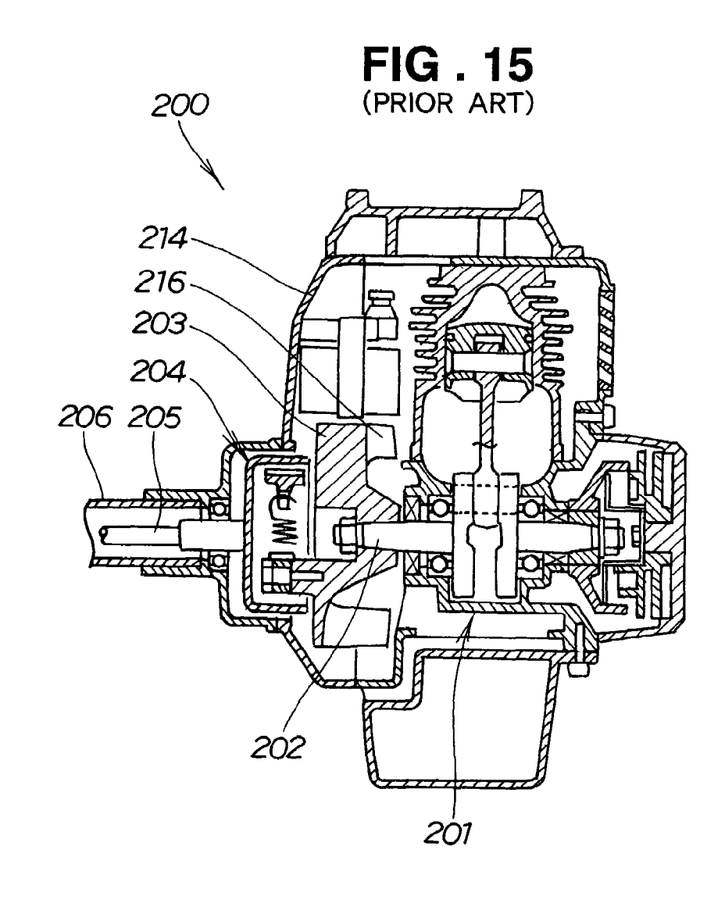
FIGS. 15 and 16 are cross-sectional views of a partial structure of a conventional bush cutting machine.

A bush cutting machine 200 shown in FIG. 15 has a structure in which one end of a drive shaft 205 is connected to an output shaft 202 of an engine 201 via a magnetic wheel 203 and a centrifugal clutch 204; a cutting blade (not shown) is connected to the other end of the drive shaft 205; and the drive shaft 205 is inserted through a tubular operating pole 206.

Figure 16:
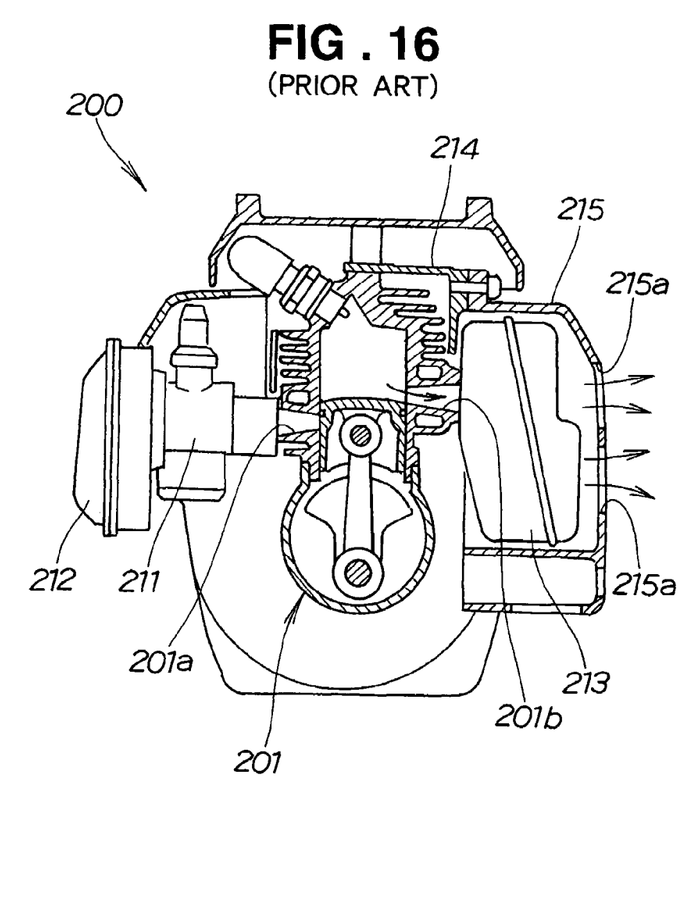

As shown in FIG. 16, an inlet 201*a* is connected to an air cleaner 212 via a carburetor 211. An exhaust muffler 213 is connected to an outlet 201*b*. The engine 201, the magnetic wheel 203 and the centrifugal clutch 204 are covered by a cover 214. The exhaust muffler 213 is covered by a muffler cover 215. A flow of air produced by a plurality of fans 216 attached to the magnetic wheel 203 cools the outer surface of the engine 201 and the outer surface of the exhaust muffler 213, and then is discharged into the air through a plurality of exhaust vents 215*a* formed in the muffler cover 215. Exhaust from the engine 201 is discharged from the exhaust muffler 213, and then is discharged through the exhaust vents 215*a* into the air.

In recent years, further improvements in agricultural work environment have been required. As for the bush cutting machine 200, a further reduction in the exhaust noise of the engine 201 is increasingly required to reduce an operator's burden.

In view of the workability and operability of the bush cutting machine 200, it is required that the bush cutting machine 200 and the engine 201 thereof be reduced in size and weight. With reductions in size and weight of the engine 201, the exhaust muffler 213 has to be reduced in size. The small exhaust muffler 213 has a small capacity, and has its limitations in reducing exhaust noise. In addition, the engine 201 and the exhaust muffler 213 are located near an operator because of the structure of the bush cutting machine 200, and the arrangement cannot be changed. In order to reduce an operator's burden, it is necessary to make improvements in reduction of the exhaust noise from an engine in a bush cutting machine without increasing the size of the bush cutting machine.

SUMMARY OF THE INVENTION

According to the present invention, there is provided a bush cutting machine which comprises a tubular operating pole; a drive shaft inserted through the operating pole; an engine provided at a first end of the operating pole, for rotating the drive shaft; a cutting blade provided at a second end of the operating pole, and rotated by rotation of the drive shaft; and an exhaust muffler provided near the engine, for discharging exhaust gases from the engine; wherein the operating pole is connected to an outlet of the exhaust muffler and doubles as an exhaust passage, whereby the exhaust gases are discharged from the exhaust muffler through the operating pole into the air.

Since the operating pole in the bush cutting machine of the present invention thus doubles as an exhaust passage connected to the outlet of the exhaust muffler, exhaust from the engine can be discharged from the exhaust muffler through the operating pole into the air. That is, exhaust is not directly discharged from the exhaust muffler into the air, but is caused to pass through the operating pole with a certain length and then discharged into the air. This ensures an exhaust passage having an adequate length on the exhaust side of the exhaust muffler. As a result, the substantial capacity of the exhaust muffler is increased, which allows a reduction in the exhaust noise of the engine and a reduction in an operator's burden. In addition, without increasing the size of the bush cutting machine, the simple structure can achieve a reduction in exhaust noise while ensuring sufficient workability and operability of the bush cutting machine.

The operating pole is preferably a double pipe with an inner pipe inserted through an outer pipe; the drive shaft is inserted through the inner pipe; and at least part of a space between the outer and inner pipes constitutes the exhaust passage. The part of the operating pole through which the drive shaft is inserted can be separated from the exhaust passage. Consequently, the drive shaft is not contaminated by exhaust gases, and neither friction nor scoring occurs at a rotating portion of the drive shaft in contact with the operating pole, by fine particles or the like included in exhaust gases. In addition, since the operating pole is constituted by a double pipe, the rigidity of the operating pole can be increased.

The exhaust gases are preferably discharged from the first end side of the operating pole, and more preferably, are discharged from the second end of the operating pole at a distance from an operator.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
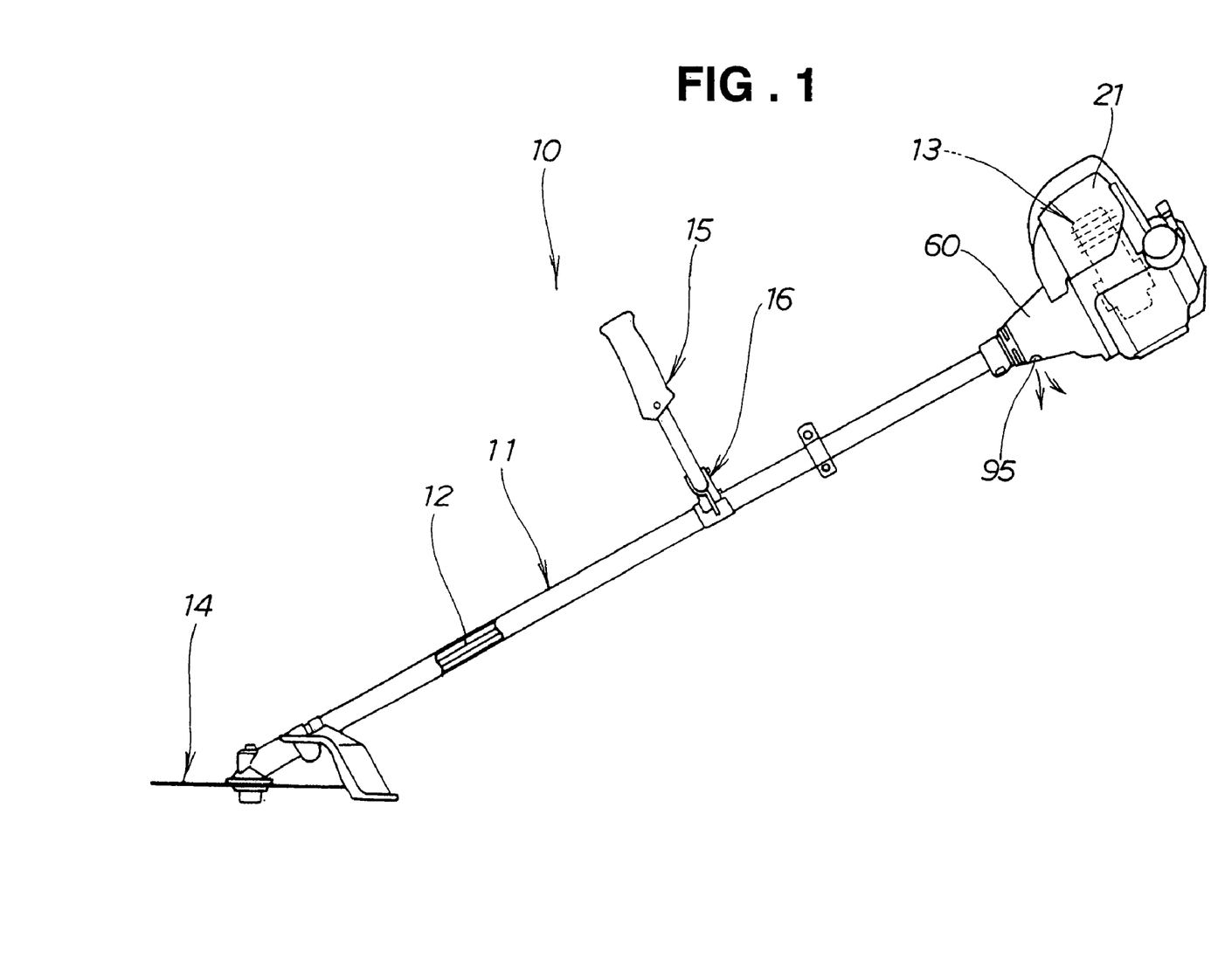
FIG. 1 is a side view of a bush cutting machine according to the present invention.
Figure 2:
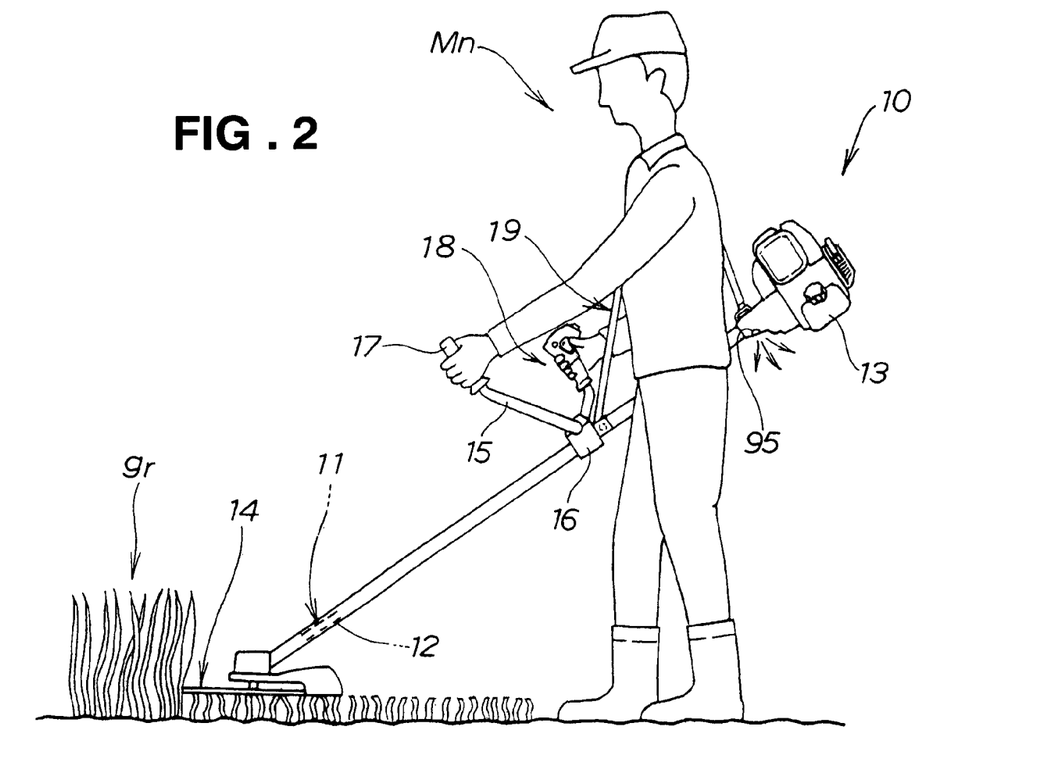
FIG. 2 is a diagram illustrating the use of the bush cutting machine shown in FIG. 1.

A bush cutting machine 10 shown in FIGS. 1 and 2 has a drive shaft 12 inserted through a tubular operating pole 11 and rotated by an engine 13 provided at a first end of the operating pole 11 to rotate a cutting blade 14 provided at a second end of the operating pole 11, thereby to cut weeds and the like.

A bar-shaped handle 15 is fixed by a handle holder 16 at a longitudinally middle portion of the operating pole 11 crosswise in a plan view. As shown in FIG. 2, the handle 15 has a substantially U shape in a front view, a middle portion of which is fixed to the operating pole 11, and is made from a pipe material or a bar member extending transversely. The transversely extending handle 15 has left and right grips 17 and 18 at distal ends thereof. The right grip 18 is provided with a throttle lever and a lock lever for controlling the engine 13.

An operator Mn puts a shoulder hanging belt 19 provided at a longitudinally middle portion of the operating pole 11 on his shoulder to hang the bush cutting machine 10, and holds the left and right grips 17 and 18 and swings the operating pole 11 from side to side while rotating the cutting blade 14 by the engine 13, thereby cutting weeds or grass gr.

Next, the structure of and around the engine 13 of the bush cutting machine 10 will be described with reference to FIGS. 3 to 7.

Figures 3, 4:
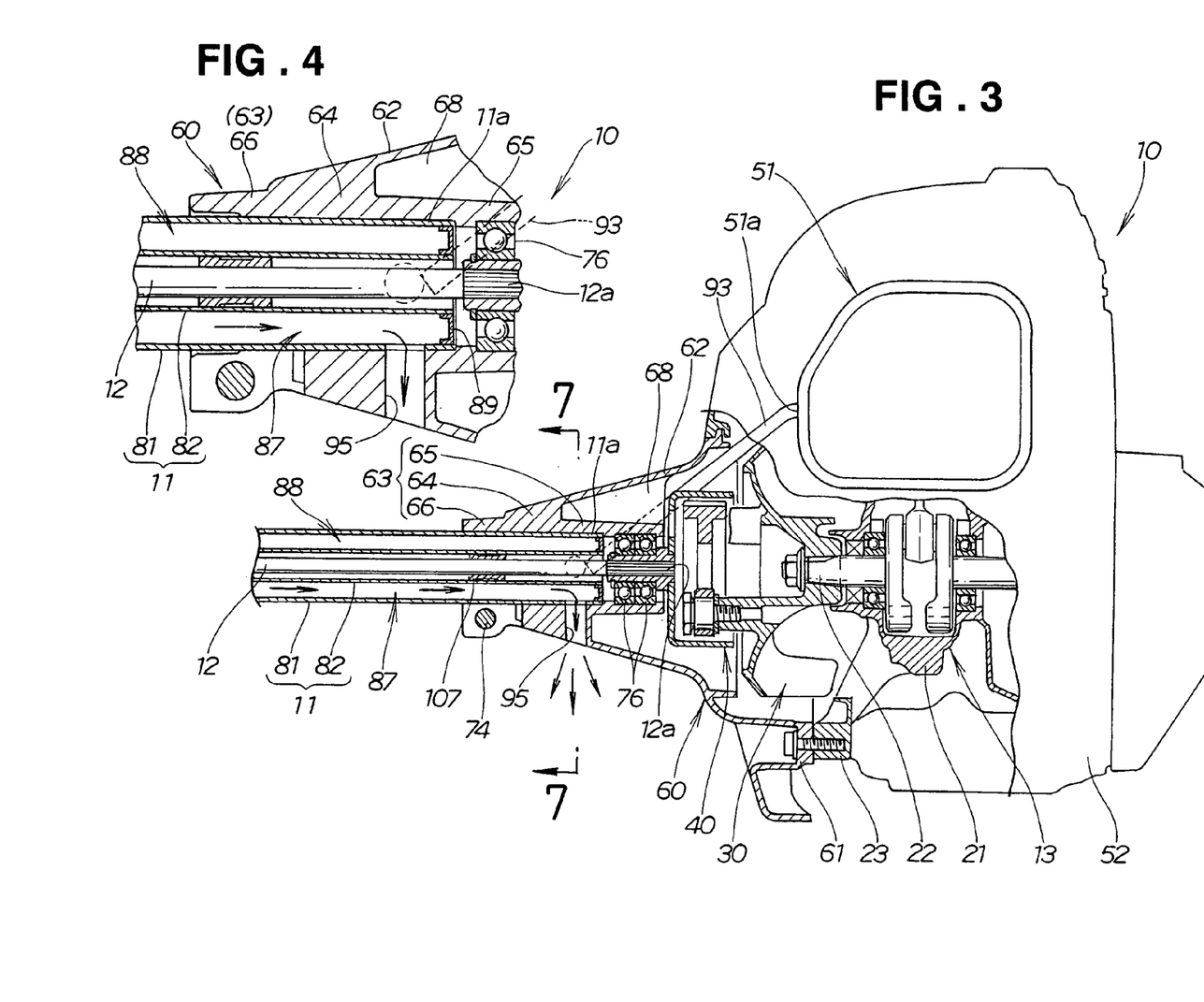
FIG. 3 is a partially cross-sectional diagram illustrating a mounted state of an engine to a drive shaft of the bush cutting machine shown in FIG. 1.
FIG. 4 is an enlarged cross-sectional diagram illustrating a mounting structure between an operating pole and an operating pole mounting portion shown in FIG. 3.

As shown in FIG. 3, the engine 13 is a single-cylinder engine in which one piston is reciprocated to rotationally drive a crankshaft 22 housed in an engine case 21 which includes a crankcase and a cylinder block. The crankshaft 22 is provided with a power takeoff protruding from the engine case 21. Hereinafter, the crankshaft 22 will be replaced with the words "output shaft 22" as appropriate.

A cooling fan 30 is mounted on the output shaft 22. The output shaft 22 is connected to a first end 12a of the drive shaft 12 via a clutch 40. The operating pole 11 and the drive shaft 12 are aligned concentrically with the output shaft 22 of the engine 13. The clutch 40 is a centrifugal clutch and is engaged by centrifugal force when the number of revolutions of the output shaft 22 exceeds a certain level.

As shown in FIGS. 3 to 6, an exhaust muffler 51 of the engine 13 is mounted to the side of the engine 13, and an inlet of the exhaust muffler 51 is connected to an exhaust port of the engine 13.

The engine 13 and the exhaust muffler 51 are covered by an engine cover 52, and the cooling fan 30 and the clutch 40 are covered by a fan cover 60. The fan cover 60 is continuous with the engine cover 52. A mounting boss 23 is extended from the engine case 21 toward the fan cover 60. A flange of the engine cover 52 and a flange 61 of the fan cover 60 are placed on and bolted to the distal end of the mounting boss 23. Thus, the engine cover 52 and the fan cover 60 are removably mounted. The engine cover 52 is a hard resin molding.

As shown in FIGS. 3 to 7, the fan cover 60 is an integral molding, e.g., a resin product such as a glass-impregnated nylon resin, and includes the flange 61 to be mounted to the engine 13 side, a hollow cover body 62 in a substantially truncated-conical shape tapered from the flange 61 toward the operating pole 11, and a cylindrical operating pole mounting portion 63 extending along the operating pole 11 at a front portion of the cover body 62. The cover body 62 covers the cooling fan 30 and the clutch 40.

Of the operating pole mounting portion 63, (1) one half thereof located closer to the engine 13 than a longitudinally substantially middle portion 64 thereof is referred to as an inside half 65, and (2) the other half is referred to as an exposed half 66. The middle portion 64 includes a flexible connecting portion 67 having flexibility (see FIGS. 5 and 6). The inside half 65 extends into the inside of the cover body 62, and thus is covered by the cover body 62. The exposed half 66 extends out from the cover body 62 toward the cutting blade 14 (see FIG. 1).

Figure 7:
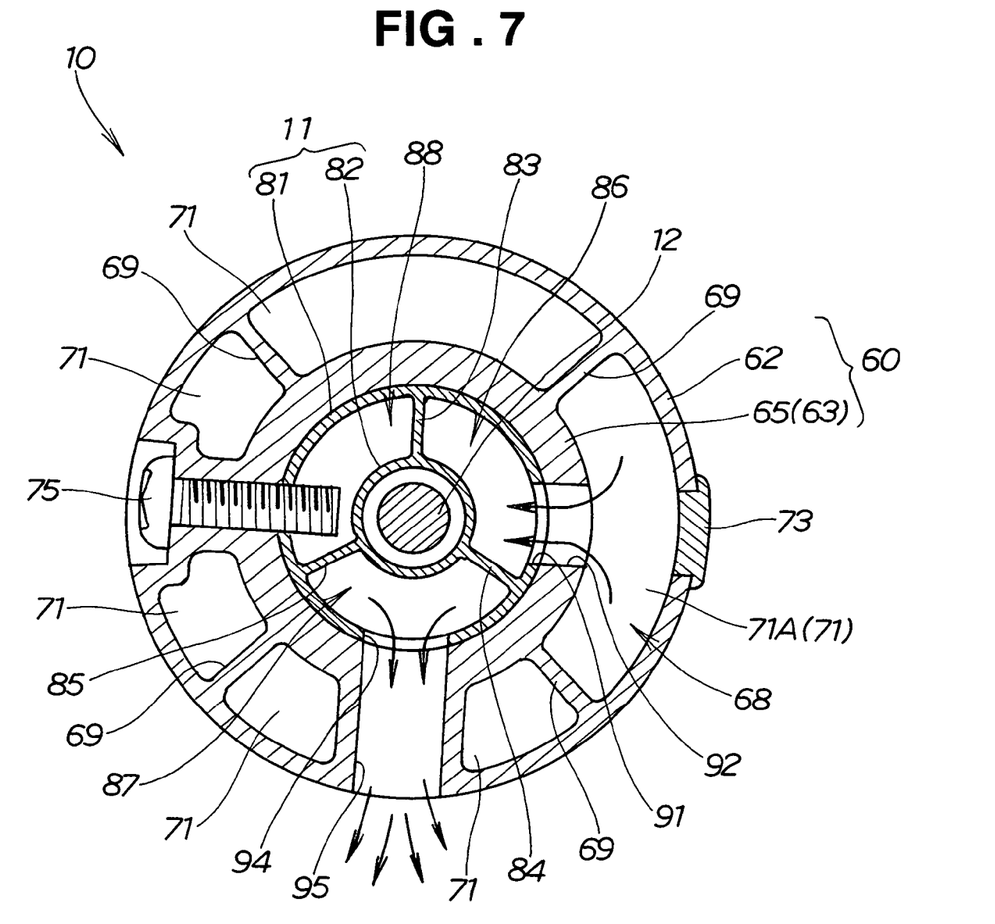
FIG. 7 is a cross-sectional view along line 7-7 of FIG. 3.

In a part of the fan cover 60 located closer to the engine 13 than the middle portion 64, an annular space 68 is formed between the tubular cover body 62 and the tubular inside half 65. In this space 68, the tubular cover body 62 and the tubular inside half 65 are connected by a plurality of stays or partitions 69 arranged radially as shown in FIG. 7. Consequently, the annular space 68 is circumferentially divided into a plurality of divided spaces 71. Each of the stays or partitions 69 is a longitudinal plate member extending lengthwise along the operating pole 11.

Figures 5, 6:
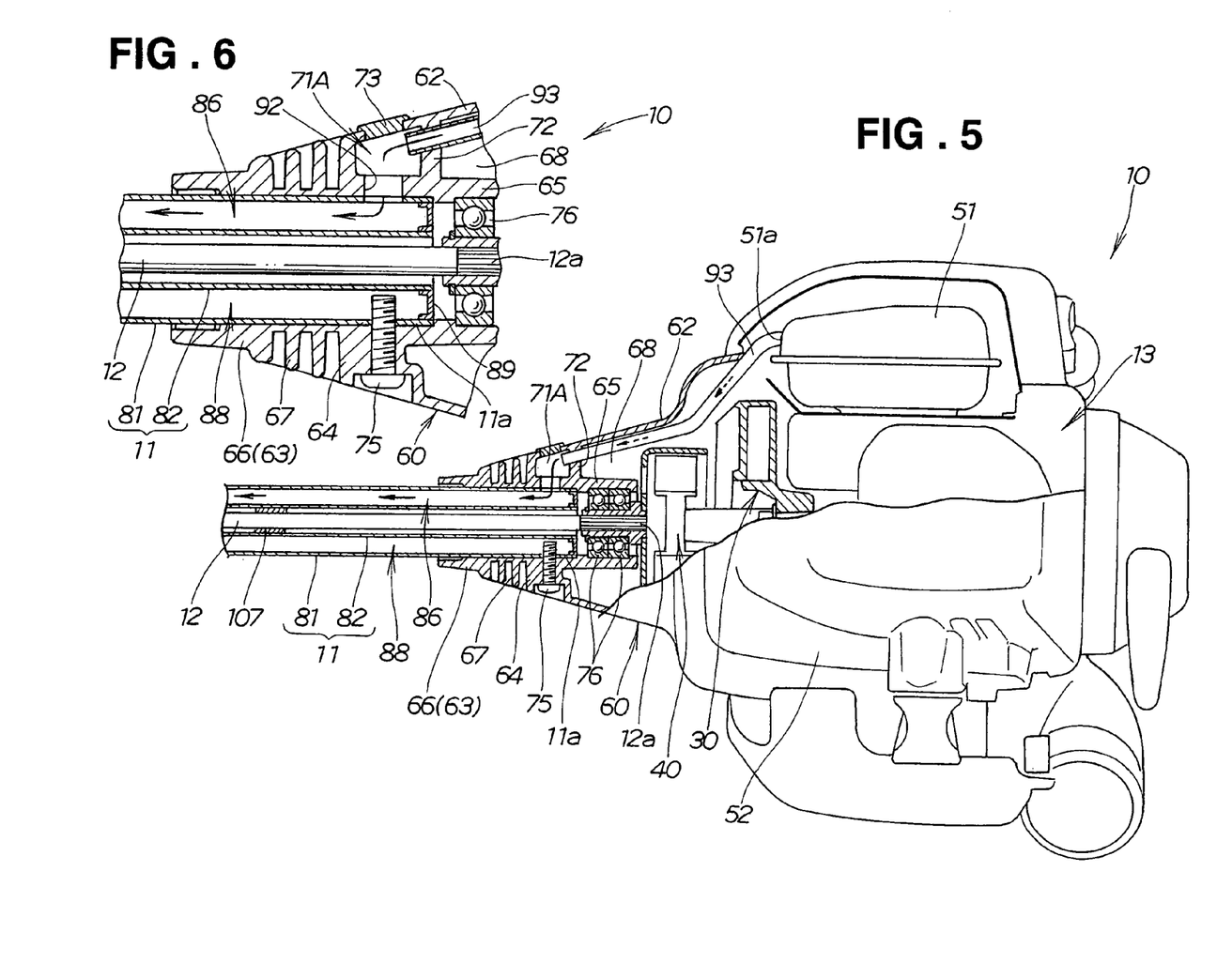
FIG. 5 is a partially cross-sectional top view of the bush cutting machine shown in FIG. 3.
FIG. 6 is an enlarged cross-sectional view of a portion in FIG. 5.

One of these divided spaces 71 is closed off by a partition plate 72 on the engine 13 side as shown in FIGS. 5 and 6 so as to be completely closed. Of the divided spaces 71, the divided space 71 closed off by the partition plate 72 is referred to as an "exhaust space 71A." Reference numeral 73 denotes a cap.

As shown in FIG. 3, the operating pole 11 is fitted in the tubular operating pole mounting portion 63. The operating pole mounting portion 63 is fastened by a bolt 74. As shown in FIGS. 5 to 7, the distal end of a locking screw 75 screwed into the operating pole mounting portion 63 is inserted into the operating pole 11. Thus, the operating pole 11 is mounted to the operating pole mounting portion 63. In other words, the engine 13 is mounted to a first end 11a of the operating pole 11 via the fan cover 60. The operating pole mounting portion 63 rotatably supports the first end 12a of the drive shaft 12 via bearings 76, 76.

As shown in FIGS. 3 to 7, the operating pole 11 is a double pipe with an inner pipe 82 extended through an outer pipe 81. The drive shaft 12 extends through the inner pipe 82. At least part of the space between the outer and inner pipes 81 and 82 serves as an exhaust passage.

Specifically, the operating pole 11 has the inner pipe 82 extended through the outer pipe 81, the outer and inner pipes 81 and 82 being connected circumferentially by a plurality of stays, e.g., circumferentially by three stays 83, 84 and 85 in the example shown in FIG. 7. The outer and inner pipes 81 and 82 and the three stays 83, 84 and 85 are made from an aluminum alloy product integrally formed by extrusion or the like. The outer and inner pipes 81 and 82 are concentrically arranged round pipes. The stays 83, 84 and 85 are longitudinal plate members arranged radially between the outer and inner pipes 81 and 82 and extending continuously in a longitudinal direction of the outer and inner pipes 81 and 82. The stays 83, 84 and 85 are reinforcing members for increasing the flexural rigidity and torsional rigidity of the operating pole 11.

The three stays 83, 84 and 85 are arranged at equal intervals. Hereinafter, the three stays 83, 84 and 85 are referred to, clockwise in FIG. 7, as a first stay 83, a second stay 84 and a third stay 85, respectively. Of the space formed between the outer and inner pipes 81 and 82, a space defined by the first stay 83 and the second stay 84 is referred to as a first space 86, a space defined by the second stay 84 and the third stay 85 as a second space 87, and a space defined by the third stay 85 and the first stay 83 as a third space 88.

As shown in FIG. 4, a cap 89 is fitted in the first end 11a of the operating pole 11, so that the spaces 86, 87 and 88 are closed at first ends thereof.

At the first end 11a of the operating pole 11, as shown in FIG. 7, the first space 86 communicates with the exhaust space 71A through connecting holes 91 and 92. As shown in FIG. 3, the exhaust space 71A is connected to an outlet 51a of the exhaust muffler 51 via a connecting tube 93 that defines together with the exhaust space 71A an exhaust gas passageway. That is, the outlet 51a communicates with the first space 86 in the operating pole 11.

On the other hand, at the first end 11a of the operating pole 11, the second space 87 opens into the air through an exhaust hole 94 in the operating role and an exhaust hole 95 in the fan cover 60.

Next, a structure around the cutting blade 14 of the bush cutting machine 10 will be described with reference to FIGS. 8 to 11.

Figure 8:
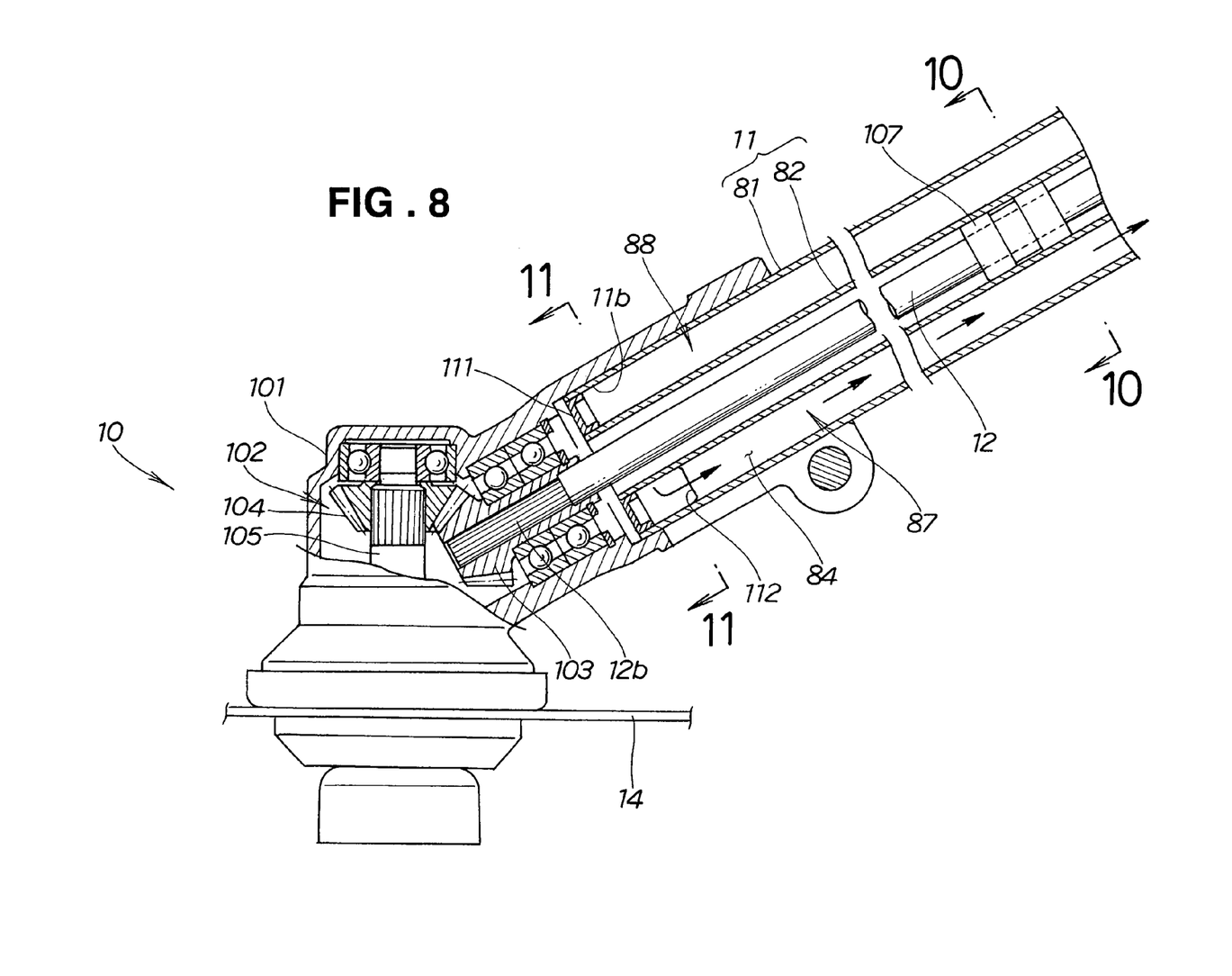
FIG. 8 is an enlarged cross-sectional view of and around a second end of the operating pole to which a cutting blade shown in FIG. 1 is mounted.
Figure 9:
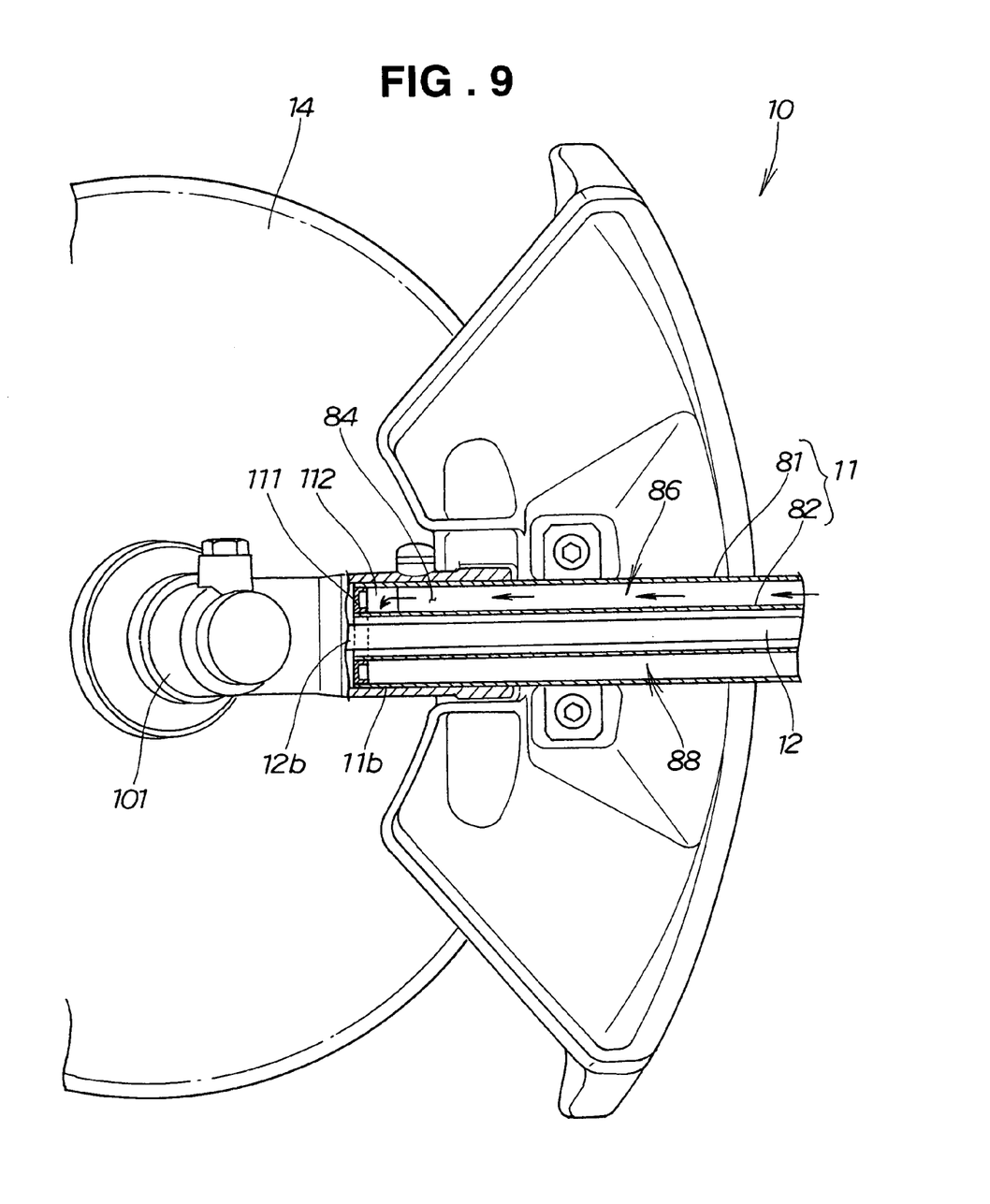
FIG. 9 is a partially cross-sectional plan view of and around the second end of the operating pole in FIG. 8.

As shown in FIGS. 8 and 9, a transmission case 101 is mounted to a second end 11b of the operating pole 11. The cutting blade 14 is rotatably mounted to the transmission case 101. A transmission mechanism 102 interposed between the drive shaft 12 and the cutting blade 14 is housed in the transmission case 101.

The transmission mechanism 102 includes a drive bevel gear 103 connected to a second end 12b of the drive shaft 12, a driven bevel gear 104 meshing with the drive bevel gear 103, and a driven shaft 105 on which the driven bevel gear 104 and the cutting blade 14 are mounted.

Consequently, as shown in FIGS. 3 and 8, power of the engine 13 is transmitted to the drive shaft 12 via the clutch 40, and is transmitted from the drive shaft 12 through the drive bevel gear 103, the driven bevel gear 104 and the driven shaft 105 to the cutting blade 14. The cutting blade 14 is rotated by the engine 13.

Figure 10:
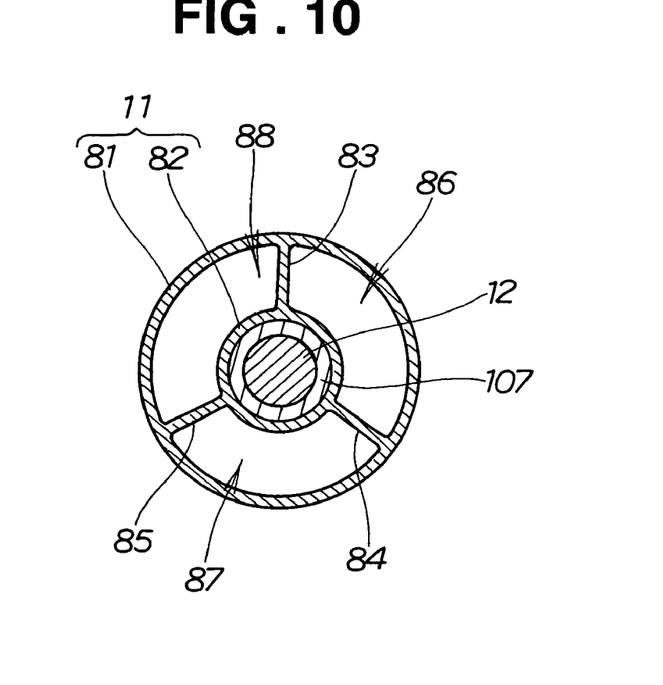
FIG. 10 is a cross-sectional view along line 10-10 of FIG. 8.

As shown in FIGS. 8 and 10, the inner pipe 82 rotatably supports the drive shaft 12 via a plurality of bushes 107 arranged longitudinally of the pipe 82 at regular intervals.

As shown in FIGS. 8 and 9, a cap 111 is fitted in the second end 11b of the operating pole 11, so that the spaces 86, 87 and 88 in the operating pole 11 are closed at second ends thereof.

Figure 11:
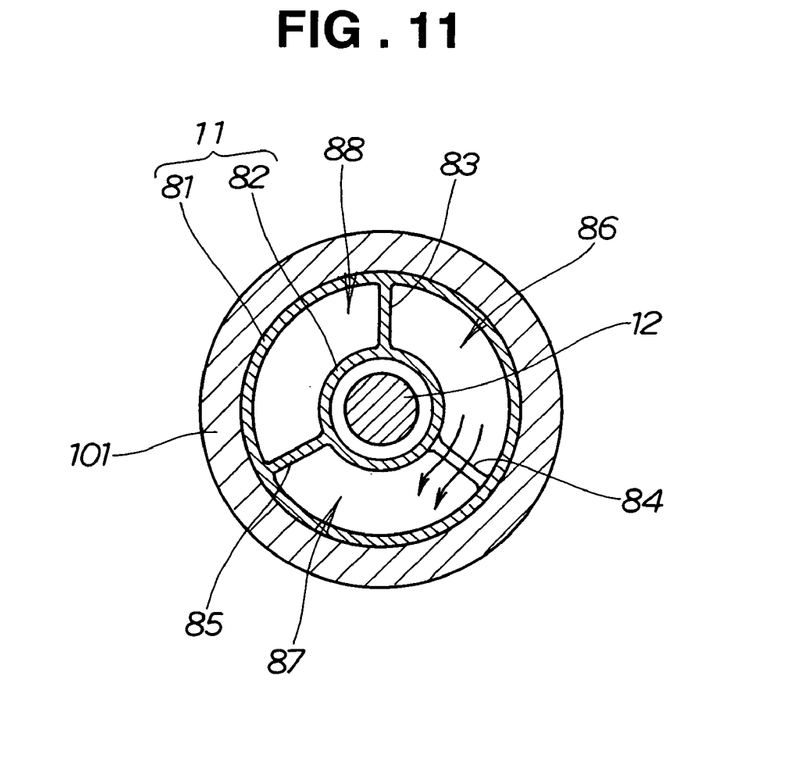
FIG. 11 is a cross-sectional view along line 11-11 of FIG. 8.

As shown in FIGS. 8, 9 and 11, the second end 11b of the operating pole 11 is further provided with a connecting opening 112 formed by cutting off an end of the second stay 84 by a certain dimension from the end of the operating pole 11. As a result, at the second end 11b of the operating pole 11, the first space 86 communicates with the second space 87 through the connecting opening 112.

Next, flows of exhaust gases in the bush cutting machine 10 with the above structure will be described with reference to FIGS. 2, 12A, 12B and 10.

Figures 12A, 12B:
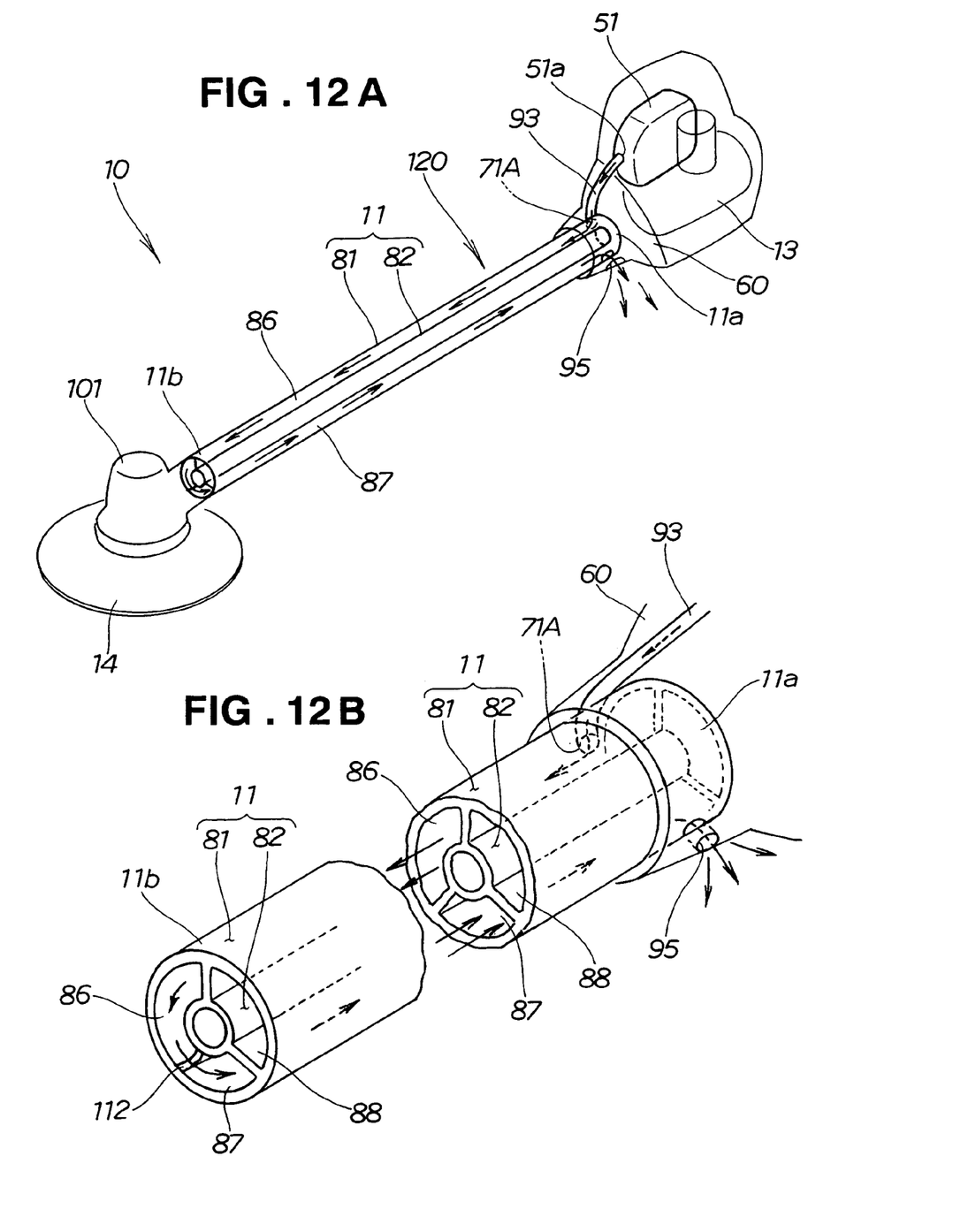
FIGS. 12A and 12B are diagrams illustrating how exhaust gases from the engine are discharged through the operating pole.

As shown in FIGS. 12A and 12B, an exhaust line 120 from the engine 13 includes the exhaust muffler 51 connected to the exhaust port of the engine 13, the connecting tube 93 connecting the outlet 51a of the exhaust muffler 51 to the exhaust space 71A formed in the fan cover 60, the first space 86 communicating with the exhaust space 71A at the first end 11a of the operating pole 11, the second space 87 communicating with the first space 86 at the second end 11b of the operating pole 11, and the exhaust hole 95 formed in the fan cover 60 and communicating with the second space 87 at the first end 11a of the operating pole 11.

Exhaust from the engine 13 is discharged from the exhaust muffler 51, and then flows through the path of the exhaust line 120 extending in the operating pole 11, changing its direction in a U shape, that is, making a U-turn, and is discharged from the exhaust hole 95 into the air.

As is clear from the above description, the first and second spaces 86 and 87 serve as an exhaust passage. That is, at least part of the space between the outer and inner pipes 81 and 82 constitutes an exhaust passage. Accordingly, the operating pole 11 doubles as an exhaust passage connected to the outlet 51a of the exhaust muffler 51, and exhaust gases are discharged from the exhaust muffler 51 through the operating pole 11 into the air.

Since the operating pole 11 thus doubles as an exhaust passage communicating with the outlet 51a of the exhaust muffler 51, exhaust gases from the engine 13 are discharged from the exhaust muffler 51 through the operating pole 11 into the air. That is, exhaust gases are not directly discharged from the exhaust muffler 51 into the air, but pass through the operating pole 11 with a certain length and then is discharged into the air. This ensures an exhaust passage having an adequate length on the exhaust side of the exhaust muffler 51. As a result, the substantial capacity of the exhaust muffler 51 is increased, and the exhaust noise of the engine is reduced. Consequently, the burden of the operator Mn (see FIG. 2) is reduced. In addition, without increasing the size of the bush cutting machine 10, the simple structure can achieve a reduction in exhaust noise while ensuring sufficient workability and operability of the bush cutting machine 10.

The operating pole 11 has a double pipe structure including the outer pipe 81 and the inner pipe 82 through which the drive shaft 12 is inserted. At least part of the space between the outer and inner pipes 81 and 82, that is, the first and second spaces 86 and 87 constitute an exhaust passage, whereby the part of the operating pole 11 through which the drive shaft 12 (see FIG. 2) is inserted is separated from the exhaust passage. Consequently, the drive shaft 12 is not contaminated by exhaust gases, and neither friction nor scoring occurs at a rotating portion of the drive shaft 12 in contact with the operating pole 11, by fine particles or the like included in exhaust gases. In addition, since the operating pole 11 is constituted by a double pipe, the rigidity of the operating pole 11 is increased.

Next, a modification of the above-described bush cutting machine 10 will be described with reference to FIGS. 13 and 14. Members identical to those in the embodiment shown in FIGS. 1 to 12B are given identical reference numerals, and will not be described.

Figure 13:
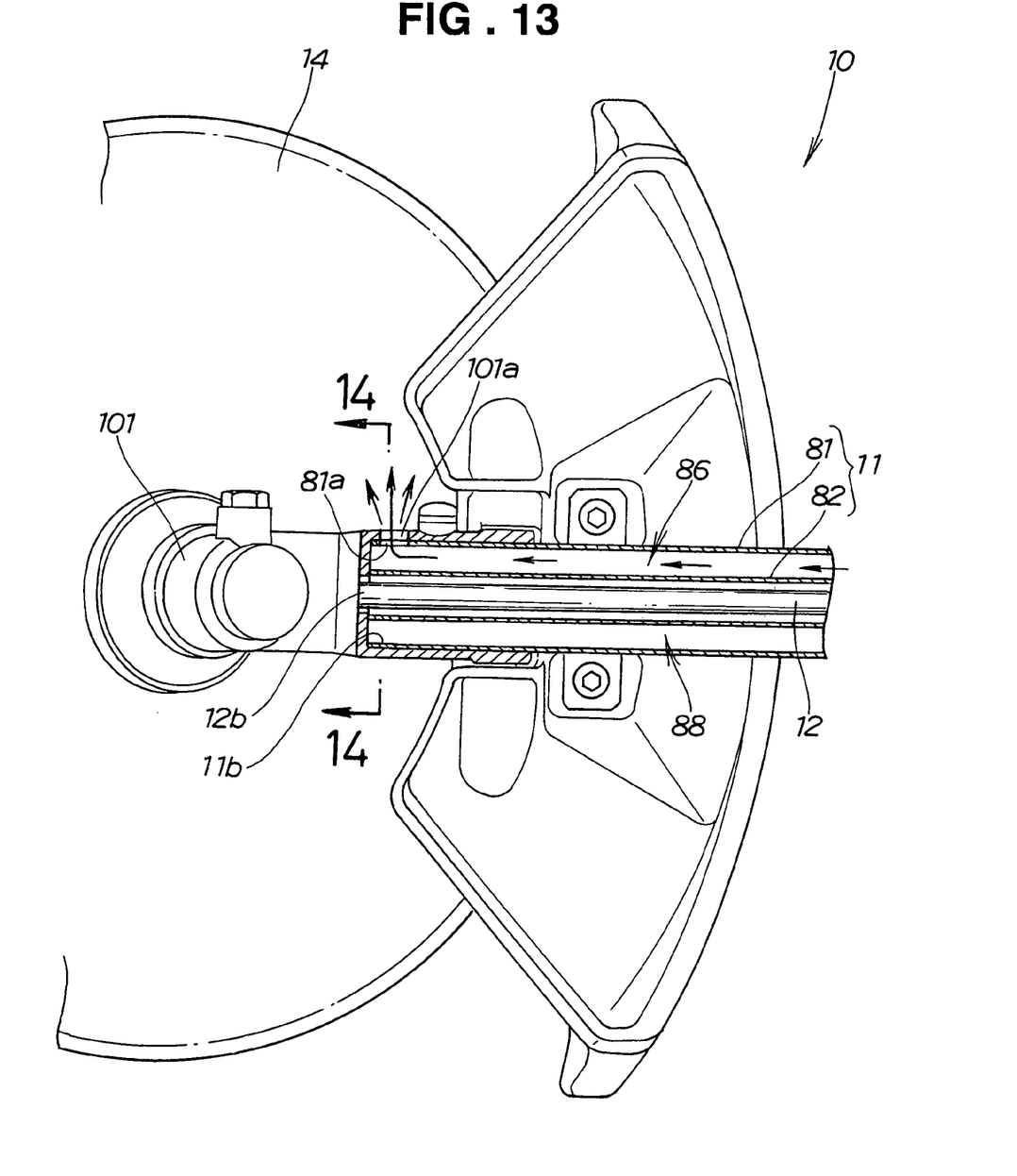
FIG. 13 is a partially cross-sectional view of and around a second end of an operating pole, illustrating a modification of the bush cutting machine according to an embodiment of the present invention.
Figure 14:
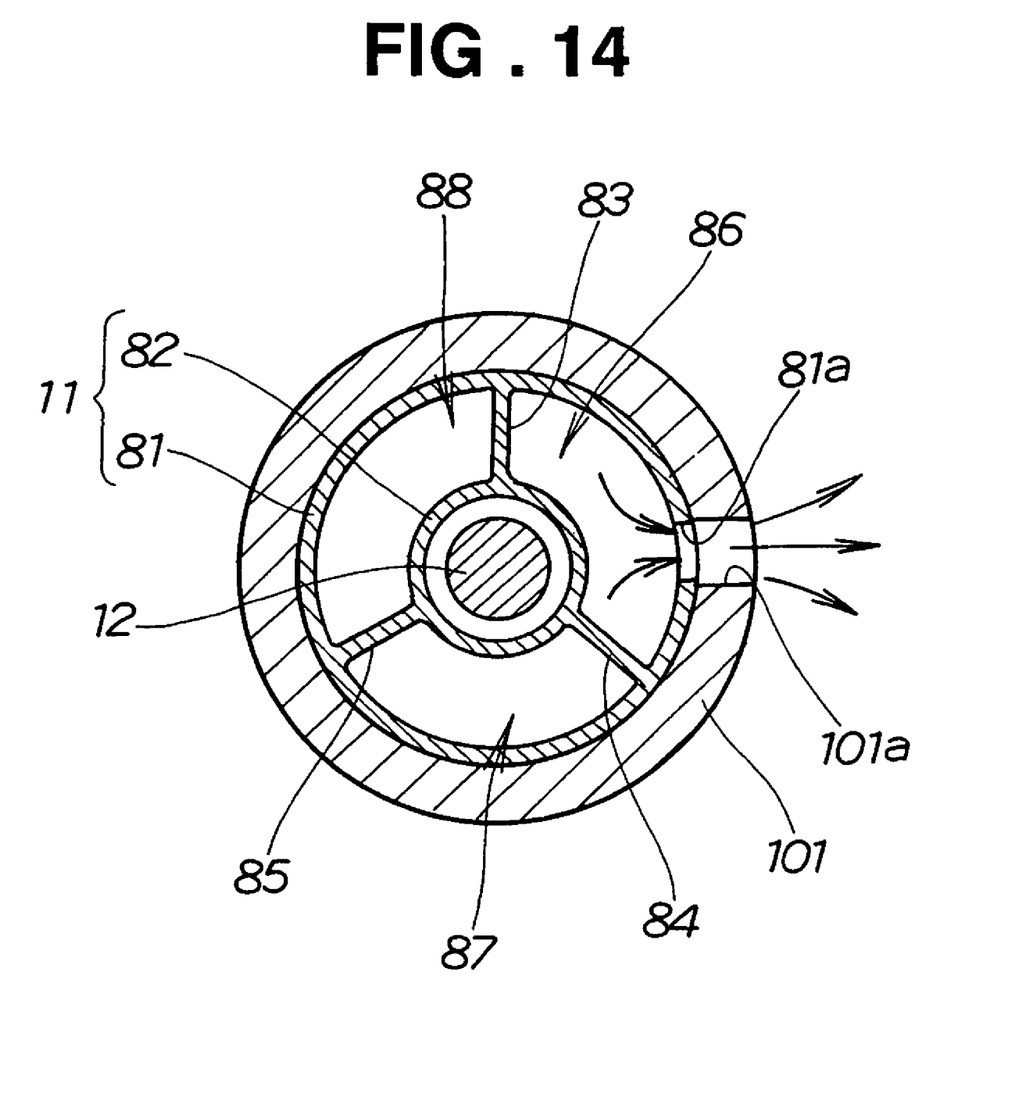
FIG. 14 is a cross-sectional view along line 14-14 of FIG. 13.

A bush cutting machine 10 in the modification shown in FIGS. 13 and 14 is configured to exhaust air from a second end 11b side of an operating pole 11, that is, from a transmission case 101 side. Specifically, at the second end 11b of the operating pole 11, the bush cutting machine 10 has (1) a first space 86 blocked off from a second space 87, (2) an exhaust hole 101a formed in the side of the transmission case 101, and an exhaust hole 81a formed in an outer pipe 81 opposite to the exhaust hole 101a, so that the first space 86 communicates with the air through the two exhaust holes 101a and 81a.

In the modification, exhaust gases from an engine 13 (see FIG. 5) flow from an exhaust muffler 51 through the first space 86 in the operating pole 11, and then are discharged from the exhaust hole 101a of the transmission case 101 into the air. In the bush cutting machine 10 of the modification, the operating pole 11 thus also doubles as an exhaust passage connected to an outlet 51a of the exhaust muffler 51.

According to the bush cutting machine 10 in the modification, the length of the exhaust passage in the operating pole 11 is reduced by half, as compared to the embodiment shown in FIGS. 1 to 12B. However, the structure of exhausting air from the second end 11b of the operating pole 11 has the exhaust location distanced from an operator Mn (see FIG. 2), and reduces the burden of the operator Mn. In addition, compared to the embodiment shown in FIGS. 1 to 12B, the structure of the bush cutting machine 10 can be simplified.

The embodiment of the present invention only needs a structure in which at least part of the space between the outer and inner pipes 81 and 82 of the operating pole 11 constitutes an exhaust passage. In addition to the above-described structure in which air is exhausted from the first end 11a or the second end 11b of the operating pole 11, a structure in which air is exhausted from a longitudinally middle portion of the operating pole 11 is also possible.

Obviously, various minor changes and modifications of the present invention are possible in the light of the above teaching. It is therefore to be understood that within the scope of the appended claims the invention may be practiced otherwise than as specifically described.

What is claimed is:

1. A bush cutting machine comprising:
    a tubular operating pole;
    a drive shaft extending lengthwise through the operating pole;
    an engine provided at a first end of the operating pole for producing a rotary output;
    a clutch interposed between the engine and the drive shaft for coupling the rotary output of the engine to the drive shaft to thereby rotate the drive shaft;
    a cutting blade provided at a second end of the operating pole and rotated by rotation of the drive shaft; and
    an exhaust muffler connected to receive exhaust gases discharged from the engine;
    wherein the operating pole is connected to an outlet of the exhaust muffler and doubles as an exhaust passage so that the exhaust gases discharged from the outlet of the exhaust muffler flow lengthwise through the operating pole and are discharged from the first end side of the operating pole into the air.

2. A bush cutting machine as set forth in claim 1; wherein the operating pole is a double pipe with an inner pipe inserted through an outer pipe, the drive shaft is inserted through the inner pipe, and at least part of a space between the outer and inner pipes constitutes the exhaust passage.

3. A bush cutting machine as set forth in claim 2; wherein the inner pipe and the outer pipe are concentric with one another.

4. A bush cutting machine comprising:
    a tubular pole having opposite first and second ends and having an exhaust hole at the first end side that communicates the interior of the tubular pole with ambient air;
    a drive shaft extending lengthwise through the tubular pole;
    an engine disposed at the first end of the tubular pole for producing a rotary output;
    a clutch interposed between the engine and the drive shaft for coupling the rotary output of the engine to the drive shaft to rotate the drive shaft;
    a cutting blade disposed at the second end of the tubular pole and connected to be rotationally driven by the drive shaft in response to rotation of the drive shaft;
    an exhaust muffler connected to receive exhaust gases discharged from the engine; and
    an exhaust gas passageway that communicates an outlet of the exhaust muffler with the interior of the tubular pole to direct the exhaust gases discharged from the exhaust muffler into and lengthwise along the interior of the tubular pole for discharge through the exhaust hole at the first end side if the tubular pole into the ambient air.

5. A bush cutting machine according to claim 4; wherein the tubular pole has an inner pipe extending lengthwise therein, the drive shaft extending lengthwise through the inner pipe, and the interior space between the inner periphery of the tubular pole and the outer periphery of the inner pipe defining an exhaust passage communicating with the exhaust gas passageway and the exhaust hole.

6. A bush cutting machine according to claim 5; wherein the exhaust passage extends serially from the first end of the tubular pole to the second end thereof and then back to the first end thereof; and wherein the exhaust gas passageway opens into the exhaust passage at the first end of the tubular pole.

7. A bush cutting machine according to claim 5; further including one or more partitions disposed in the interior space and extending lengthwise of the tubular pole to divide the interior space into a plurality of circumferentially divided spaces, at least one of the divided spaces constituting the exhaust passage.

8. A bush cutting machine according to claim 7; wherein two of the divided spaces constitute the exhaust passage, the two divided spaces communicate with one another at the second end of the tubular pole, and the exhaust gas passageway opens into one of the two divided spaces at the first end of the tubular pole and the exhaust hole opens into the other of the two divided spaces at the first end of the tubular pole.

9. A bush cutting machine according to claim 7; wherein the tubular pole and the inner pipe are concentric with one another.

10. A bush cutting machine according to claim 5; wherein the tubular pole and the inner pipe are concentric with one another.

11. A bush cutting machine according to claim 4; further including a handle connected to the tubular pole at a mid-portion along the length thereof to enable an operator to grip and manipulate the bush cutting machine during use thereof.

12. A bush cutting machine according to claim 4; further including an inner pipe disposed inside the tubular pole and extending lengthwise therealong and dividing the interior of the tubular pole into an annular space that communicates with the exhaust gas passageway and the exhaust hole and a center space through which extends the drive shaft.

13. A bush cutting machine according to claim 12; wherein the annular and center spaces are concentric with one another.

* * * * *